US006217438B1

United States Patent
Dausch

(10) Patent No.: US 6,217,438 B1
(45) Date of Patent: Apr. 17, 2001

(54) INTEGRATED AIR CONDUIT FOR MOTOR VEHICLE INSTRUMENT PANEL

(75) Inventor: Uwe Dausch, St Denis (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/155,745

(22) PCT Filed: Feb. 4, 1998

(86) PCT No.: PCT/FR98/00203

§ 371 Date: Oct. 5, 1998

§ 102(e) Date: Oct. 5, 1998

(87) PCT Pub. No.: WO98/34806

PCT Pub. Date: Aug. 13, 1998

(30) Foreign Application Priority Data

Feb. 5, 1997 (FR) .................................................. 97 01296

(51) Int. Cl.[7] .................................................. B60H 1/26
(52) U.S. Cl. .................. 454/69; 264/318; 264/336; 264/DIG. 58; 454/121; 454/143
(58) Field of Search ................. 454/69, 121, 124, 454/127, 137, 143, 144, 152; 264/318, 334, 336, 438, DIG. 58

(56) References Cited

U.S. PATENT DOCUMENTS

| 3,635,305 | | 1/1972 | Kunishi et al. . | |
|---|---|---|---|---|
| 3,987,144 | * | 10/1976 | Nickold | 264/318 |
| 4,536,364 | * | 8/1985 | Lindskog | 264/227 |
| 4,646,879 | | 3/1987 | Mahler et al. . | |
| 5,383,815 | * | 1/1995 | Kiesel et al. | 454/137 |

FOREIGN PATENT DOCUMENTS

| 28 39 571 | 3/1980 | (DE) . |
|---|---|---|
| 37 02 629 | 8/1988 | (DE) . |
| 38 18 666 | 12/1988 | (DE) . |

OTHER PUBLICATIONS

International Search Report dated May 13, 1998.

* cited by examiner

*Primary Examiner*—Harold Joyce
(74) *Attorney, Agent, or Firm*—Morgan & Finnegan LLP

(57) ABSTRACT

The invention concerns an air conduit for motor vehicle instrument panel made in the form of an open conduit with a longitudinal slot defined by two fusion faces, the open conduit being produced in one single piece with the instrument panel by moulding a ductile material enabling the stripping by widening the longitudinal slot, means for joint being provided by joining the fusion faces of the longitudinal slop after stripping.

19 Claims, 2 Drawing Sheets

INTEGRATED AIR CONDUIT FOR MOTOR VEHICLE INSTRUMENT PANEL

BACKGROUND OF THE INVENTION

This invention relates to an air duct arranged to be incorporated in a fascia panel of a motor vehicle, and also to a method for making it.

A motor vehicle fascia panel usually contains at least one duct for air distribution which is arranged to be supplied with a stream of treated air coming from a heating and ventilating, and/or air conditioning, apparatus, and to deliver this treated air to vents which are open in selected places in the cabin of the vehicle.

These vents usually include de-icing vents for de-icing and de-misting the windscreen and where appropriate side windows of the vehicle. The vents also include ventilating vents which are disposed on a front part of the fascia panel and consist of side vents and at least one central vent.

Most known fascia panels contain a plurality of ducts, generally of plastics material, which are interposed between the heating and ventilating and/or air conditioning apparatus and the various vents.

The de-icing and de-misting vents are generally supplied through ducts of plastics material which are fixed underneath the armature of the fascia panel and connected to a diffuser, which is also of plastics material and which is again fixed on the armature of the fascia panel and arranged to be connected to the outlet of the heating and ventilating and/or air conditioning apparatus.

Similarly, the ventilating vents are generally supplied through ducts of plastics material which are assembled mechanically and which are fixed underneath the armature of the fascia panel and connected to a further diffuser.

Thus the diffusion of air in these known fascia panels necessitates a multiplicity of ducts and connections interposed between the heating and ventilating and/or air conditioning apparatus and the vents. This gives rise to a certain number of disadvantages: possible leaks because of the connections, air noise (vibrations in the walls of the tubes), heat losses, air pressure losses, a large number of components, occupation of much space within the fascia panel, a long and complicated fitting process, and as a result high cost.

It is also known from the publication DE-3 818 666 to provide a fascia panel which includes an integral air distribution channel. This channel is made in the form of a single member which is fixed on the underside of the fascia panel. This known solution does indeed enable the number of components to be reduced, but nevertheless it has most of the disadvantages mentioned above, due in particular to the fact that the air distribution channel is not formed in one piece with the fascia panel.

Up to the present time all attempts to make a fascia panel which includes one or more integral air ducts have been unable truly to succeed, in view particularly of the problems posed by moulding of hollow parts with complex forms.

BRIEF SUMMARY OF THE INVENTION

The object of the invention is to obtain an integral air duct for a vehicle fascia panel which avoids the above mentioned drawbacks.

To this end, it proposes an integral air duct for a motor vehicle fascia panel, characterised in that it is made in the form of an open duct having a longitudinal slot bounded by two lips, in that the open duct is formed in one piece with the fascia panel by moulding in a deformable material which permits stripping from the mould with widening of the longitudinal slot, and in that it includes joining means for joining together the lips of the longitudinal slot after stripping from the mould.

Thus the air duct of the invention is made in the form of an open duct in a deformable material which can be moulded to the desired form and then stripped from the mould with spreading of the slot of the duct, while being formed in one piece with the fascia panel.

In this connection, having regard to the deformation and flexibility properties of the material used for moulding, it is possible to effect stripping from the mould under stress by temporarily opening up the longitudinal slot of the duct, the lips of the slot being then brought together with a view to joining them together by means of the joining means.

The elastic memory effect of the material used for moulding generally facilitates bringing the lips together.

In a preferred embodiment of the invention, the longitudinal slot is on the opposite side from the fascia panel.

According to another features of the invention, the deformable material is a plastics material.

It is preferred to use a foam of plastics material, because this is a material which is both deformable and a thermal insulator.

The joining means may be mechanical means. In particular, the joining means comprise two conjugate profiles formed respectively on the lips of the longitudinal slot, and arranged to be mated together.

Other joining means may be envisaged, in particular means for adhesive bonding or welding.

In another aspect, the invention provides a method of making an air duct according to one of claims 1 to 7, the duct having a given external form and a given internal form, characterised in that it comprises the following operations:

(a) providing a mould comprising a male part and a female part, which are adapted to define together a mould cavity matched to the external form of the duct and that of the fascia panel, the male part including a mould core matched to the internal form of the duct and attached to a narrow web;

(b) injecting a moulding material between the male part and the female part of the mould in such a way as to fill the mould cavity and form an open duct having an open annular cross section defining, in register with the web, a longitudinal slot bounded by two adjacent lips;

(c) separating the male part and the female part of the mould;

(d) stripping the duct and the fascia panel from the mould by widening the slot so as to extract the mould core; and (e) joining together the two lips of the longitudinal slot so as to close the duct.

In one embodiment of the invention, operation (b) comprises injection of the moulding material between the male part and the female part of the mould in a position in which they are brought together. This is then a method of injection with a closed mould.

In another embodiment of the invention, operation (b) comprises injection of the moulding material between the male part and the female part of the mould in a position in which the said parts are separated from each other, and then bringing the male part and the female part of the mould together. This is then a method of injection of the open mould type.

The method of the invention thus enables a duct to be made with given external and internal forms, which forms an integral part of a fascia panel, and this is achieved with the use of a mould comprising complementary male and female parts, with the male part including a core matched to the internal form of the duct.

During the operation of stripping from the mould, the core is not removed, because it remains fixed to the male part. Stripping is achieved by deformation of the duct under stress, by virtue of the deformation properties of the moulding material.

For the stripping operation it is sufficient to deform the duct by spreading the slot enough to enable the core to be extracted laterally.

Manufacture of a similar but unslotted duct at the same time as the fascia panel was not possible with a conventional moulding method because extraction of the core in the axial direction of the duct was impossible.

In one embodiment of the invention, the method includes, prior to the injection operation (b), putting in place an insert between the male part and the female part of the mould so as to constitute an armature of the fascia panel.

Alternatively or in addition, the method includes, prior to the injection operation (b), putting in place a coating between the male part and the female part of the mould so as to constitute an external skin of the fascia panel on the side opposite to the duct.

Preferably, the injection operation (b) comprises injection of a plastics material capable of forming a foam.

The operation of joining together the two lips of the longitudinal slot is preferably carried out either by mechanical assembly or again by adhesive bonding.

In another aspect, the invention provides a vehicle fascia panel which includes at least one integral air duct as defined above.

BRIEF DESCRIPTION OF THE DRAWINGS

In the following description, which is given by way of example only, reference is made to the attached drawings in which.

DETAILED DESCRIPTION OF THE INVENTION

Figure 1:
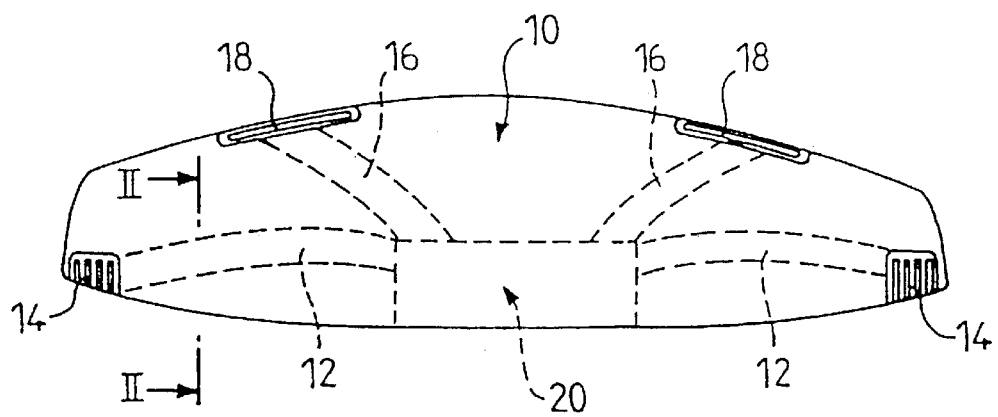
FIG. 1 is a top plan view of a motor vehicle fascia panel including integrated air ducts according to the invention.

Reference is first made to FIG. 1, which shows a motor vehicle fascia panel 10 that incorporates two air ducts 12 (ventilating ducts) which lead to vents 14 arranged respectively at the two ends of the fascia panel, together with two air ducts 16 (de-icing ducts) which lead respectively to two vents 18 for the purpose of de-icing and de-misting the windscreen (not shown) of the vehicle.

The two ducts 12 and the two ducts 16 are fed from a heating and ventilating apparatus 20 which is arranged underneath the fascia panel, in the engine compartment or in the cabin of the vehicle.

The apparatus 20 includes regulating means and distribution means for passing treated air into the ducts 12 and 16 under the control of the user.

These ducts have forms which are generally complex so as to take into account various requirements, especially those concerned with dimensioning, which are caused by various items of apparatus mounted underneath the fascia panel.

Figure 2:
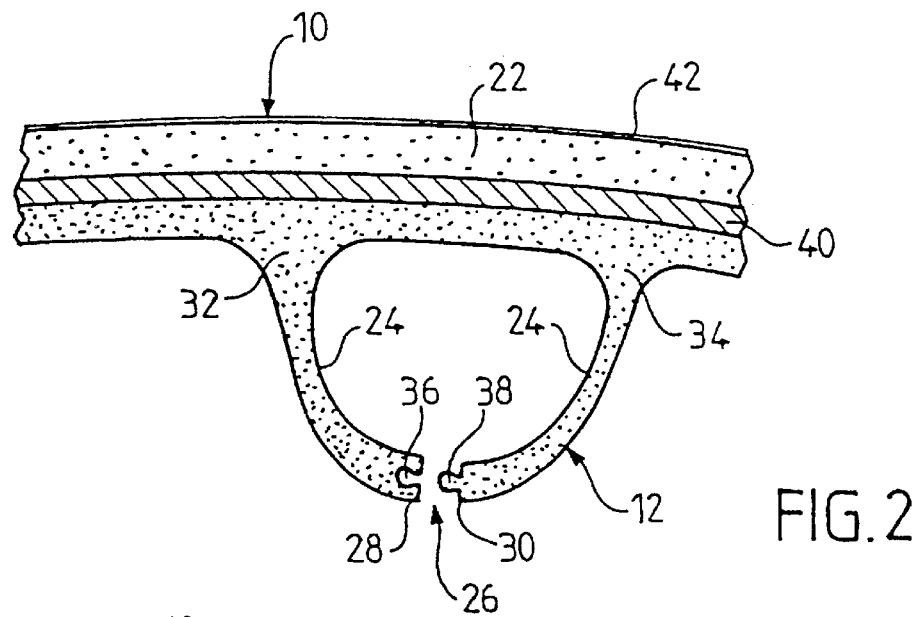
FIG. 2 is a scrap view in cross section on the line II—II in FIG. 1 and on an enlarged scale, the duct being shown in an open configuration.

Reference is now made to FIG. 2 for a more particular description of the structure of one air duct, which in this case is the duct 12 situated on the left hand side of the fascia panel 10, this duct being incorporated in the fascia panel.

As can be seen in FIG. 2, the fascia panel 10 includes a core 22 which is formed by moulding at the same time as the above mentioned air ducts and in particular the duct 12. This latter is made in the form of an open duct having a wall 24 with a transverse cross section in the form of an open annulus, the said wall 24 being interrupted by a longitudinal slot 26 which is bounded by two adjacent lips 28 and 30. The wall 24 is attached to the core 22 of the fascia panel in the region of two zones 32 and 34. The lips 28 and 30 comprise two conjugate profiles, namely, respectively, a female profile 36 and a male profile 38 which are arranged to cooperate by being fitted together so as to close the duct. the fascia panel 10 and the duct 12 are made in one piece from a deformable material such as to give them, in particular, properties of flexibility which permit an operation of injecting the deformable material followed by an operation of stripping from the mould with widening of the slot 26, as will be seen later herein.

In the core 22 of the fascia panel 10 there is embedded, during the moulding operation, an insert 40 which is intended to serve as a stiffening armature. This insert may consist in particular of a grid made of metal or plastics material having apertures to enable the moulding material to pass through it.

In the example shown in FIG. 2, the fascia panel also has an external coating 42 constituting a "skin" of chosen appearance, the coating being situated on the opposite side of the core 22 from the duct 12.

After the plastics material has been stripped from the mould, the duct 12 is in an open configuration as shown in FIG. 2, in which the lips 28 and 30, although close to each other, are not mated together.

Figure 3:
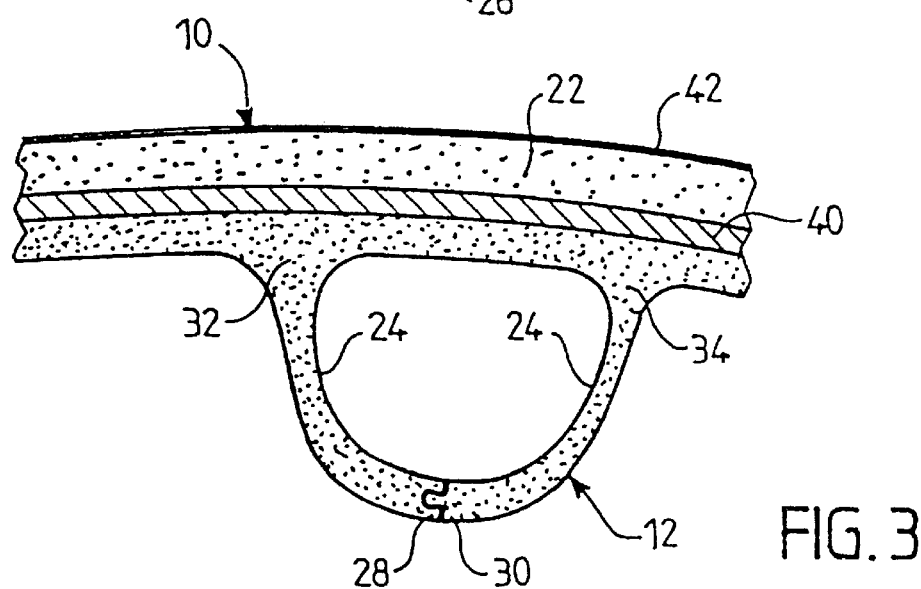
FIG. 3 is a view similar to that in FIG. 2, with the duct being shown in a closed configuration.

In order to close the duct, it is sufficient to bring the lips 28 and 30 mechanically together and to clip them together so as to give a closed configuration as shown in FIG. 3.

The fastening of the two lips 28 and 30 can of course be done by other means, in particular adhesive bonding.

It should be noted that the joining together of the two lips of the slot is generally facilitated by the elastic memory properties of the plastics material, as a result of which the lips 28 and 30 move close to each other after the operation of stripping from the mould.

Figure 4:
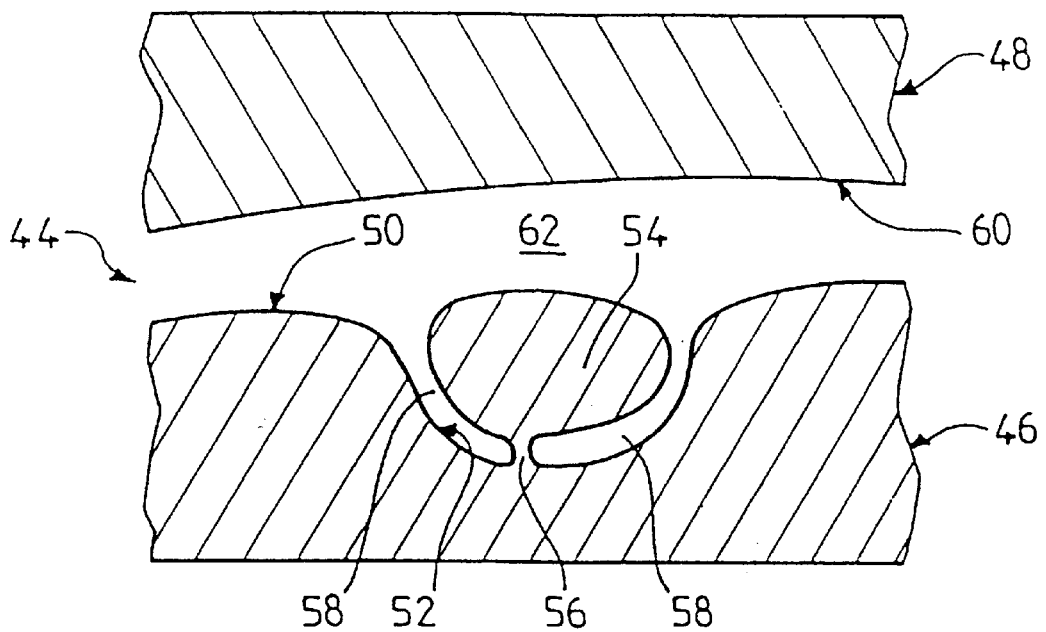
FIG. 4 is a view in cross section of a two-part mould for making a fascia panel with integrated ducts according to FIG. 1, the mould being empty.
Figure 5:
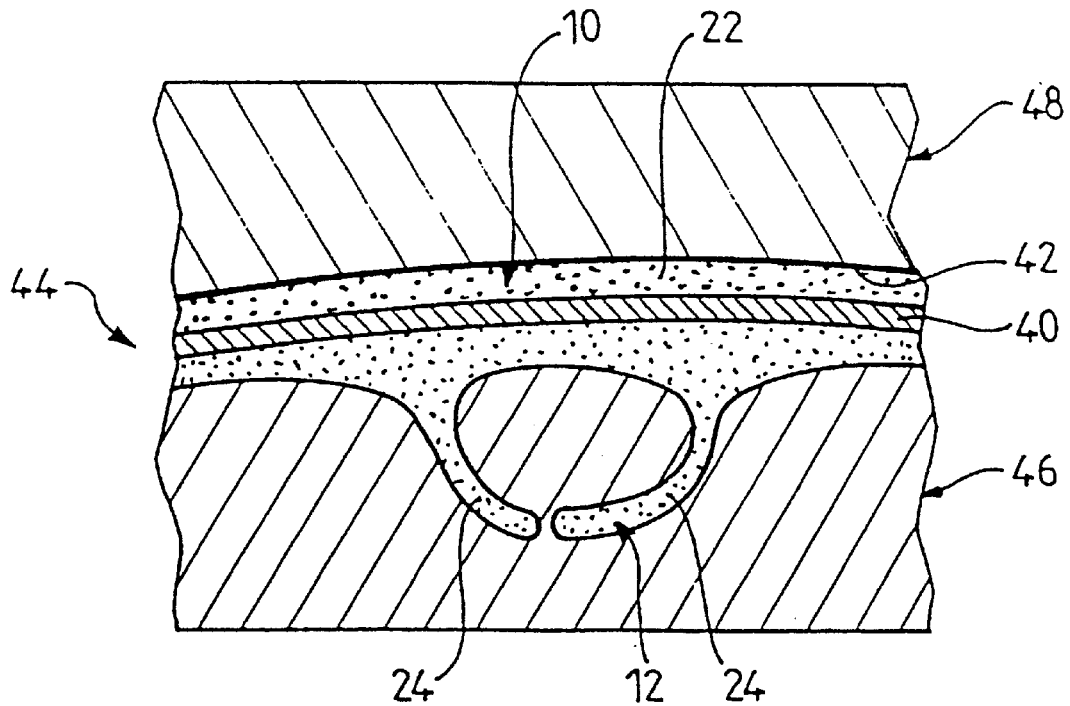
FIG. 5 is a view similar to that in FIG. 4 after an insert has been positioned and plastics material injected.

Reference is now made to FIGS. 4 and 5 in order to describe the manufacture of the fascia panel 10 with its integrated ducts according to the invention.

Its manufacture is obtained by moulding using a mould 44 in two parts (FIG. 4) comprising a male part 44 and a female part 48 which are shown in this example in a lower position and an upper position respectively.

The male part 46 includes a base 50 which has a hollow portion 52 in which a moulding core 54 is formed, the latter being joined to the remainder of the part 46 through a narrow web 56 constituting an integral bridge. The hollow portion 52 and the core 54 together define two curved regions 58 which are designed for forming, in the moulding operation, the two parts of the wall 24 of the duct. The web 56 enables the longitudinal slot 26 that interrupts the wall 24 to be formed.

The female part 48 includes a moulding face 60 which is arranged to come into facing relationship with the base 50 of the male part 46, so as to form by moulding the external upper face (or exposed face) of the fascia panel.

In the position of FIG. 4, the male part 46 and the female part 48 of the mould 44 are brought together so that they define a moulding cavity 62 the form of which is matched to that of the fascia panel and duct.

To form the fascia panel and its integral duct, an insert 40, similar to that shown in FIGS. 2 and 3, is inserted between the male and female parts of the mould. A coating suitable for forming the outer skin 42 is also disposed along the moulding 60 of the male part 46. Then, between the male and female parts 46, 48 of the mould there is injected a deformable plastics material which is preferably a material of the foam type having properties of flexibility.

Referring to FIG. 5, after foaming of the plastics material, the parts 46 and 48 of the mould are separated, which gives a fascia panel with an integrated duct as shown in FIG. 2. The flexibility of the plastics material used, in particular that of foam, enables stripping from the mould to take place with widening of the longitudinal slot 26. The lips 28 and 30 of this slot therefore move apart from each other and have a tendency subsequently to move together again due to the elastic memory properties of the material.

It is sufficient subsequently to fit the two lips 28 and 30 together, either by mechanical mating as shown in FIGS. 2 and 3, or in any other mechanical way, or again by adhesive bonding or welding.

The injection of the plastics material may be either of the open mould type with the two parts of the mould being fitted together, or of the closed mould type, the two parts of the mould being first separated from each other and subsequently brought together.

The moulding material is preferably a foam of plastics material, and preferably one having closed pores, for example of the polyurethane type.

The above mentioned external skin may be obtained either by using a separate coating or from the plastics material itself.

In another version not shown, the method of the invention further includes fitting in place a film surrounding the moulding core and the web of the male part of the mould, so as to form a sealed film within the duct 12.

The method of moulding of the invention thus enables a fascia panel to be made in one piece with one or more integral air ducts. These ducts may have various forms capable of offering non-linear paths, or even sinuous paths, and provide a transverse cross section the form of which is either constant or varying.

What is claimed is:

1. An air duct for a motor vehicle fascia panel said duct having a longitudinal slot bounded by two lips, said duct being formed in one piece with the fascia panel from a deformable material which permits stripping from mould with widening of the longitudinal slot and joining means for joining together the lips of the longitudinal slot after stripping from the mould.

2. An air duct according to claim 1, wherein the longitudinal slot is disposed opposite the fascia panel.

3. An air duct according to claim 1, wherein the deformable material comprises a plastics material.

4. An air duct according to claim 1, wherein the joining means comprise mechanical means.

5. An air duct according to claim 4, wherein the joining means comprise two conjugate profiles formed respectively on the lips of the longitudinal slot, and arranged to be mated together.

6. An air duct according to claim 1, wherein the joining means comprise means for adhesive bonding or welding.

7. A motor vehicle comprising a fascia panel including the air duct of claim 1, the fascia panel further comprising a core having an exterior surface and an interior surface, the air duct integral with the core and extending from the interior surface of the core.

8. The motor vehicle according to claim 7 wherein the fascia panel further comprises a stiffening member disposed intermediate the exterior and interior surfaces of the core.

9. An air duct according to claim 1 wherein the deformable material comprises polyurethane.

10. A method of making a fascia panel for a motor vehicle having an integral air duct comprising the following operations:

(a) providing a mould comprising a male part and a female part, which are adapted to define together a mould cavity matched to the external form of the duct and that of the fascia panel, the male part including a mould core matched to the internal form of the duct and attached to a narrow web;

(b) injecting a moulding material between the male part and the female part of the mould in such a way as to fill the mould cavity and form an open duct having an open annular cross section defining, in register with the web, a longitudinal slot bounded by two adjacent lips;

(c) separating the male part and the female part of the mould;

(d) stripping the duct and the fascia panel from the mould by widening the slot so as to extract the mould core; and (e) joining together the two lips of the longitudinal slot so as to close the duct.

11. A method according to claim 10, wherein operation (b) comprises injection of the moulding material between the male part and the female part of the mould in a position in which they are brought together.

12. A method according to claim 10, wherein operation (b) comprises injection of the moulding material between the male part and the female part of the mould in a position in which the said parts are separated from each other, and then bringing the male part and the female part of the mould together.

13. A method according to claim 10, which further comprises prior to the injection operation (b), putting in place an insert between the male part and the female part of the mould so as to constitute an armature of the fascia panel.

14. A method according to claim 10, which further comprises prior to the injection operation (b), putting in place a coating between the male part and the female part of the mould so as to constitute an external skin of the fascia panel on the side opposite to the duct.

15. A method according to claim 10, wherein the injection operation (b) comprises injection of a plastics material capable of forming a foam.

16. A method according to claim 10, wherein operation (e) comprises joining together the two lips of the longitudinal slot by mechanical assembly.

17. A method according to claim 10, wherein operation (e) comprises joining together the two lips of the longitudinal slot by adhesive bonding or welding.

18. A method of claim 10 wherein the injection operation (b) comprises injection of polyurethane.

19. A method according to claim 10 which further comprises, prior to the injection operation (b), putting a film around the mould core and the web of the male part of the mould so as to form a sealed film within the duct.

* * * * *